(12) United States Patent
Ramaiyer

(10) Patent No.: US 11,704,294 B2
(45) Date of Patent: *Jul. 18, 2023

(54) SYSTEM AND METHOD FOR SLOWLY CHANGING DIMENSION AND METADATA VERSIONING IN A MULTIDIMENSIONAL DATABASE ENVIRONMENT

(71) Applicant: Oracle International Corporation, Redwood Shores, CA (US)

(72) Inventor: Kumar Ramaiyer, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/200,589

(22) Filed: Mar. 12, 2021

(65) Prior Publication Data

US 2021/0286787 A1  Sep. 16, 2021

Related U.S. Application Data

(63) Continuation of application No. 16/023,802, filed on Jun. 29, 2018, now Pat. No. 10,983,972.

(Continued)

(51) Int. Cl.
*G06F 16/21* (2019.01)
*G06F 16/28* (2019.01)
(Continued)

(52) U.S. Cl.
CPC ........ *G06F 16/219* (2019.01); *G06F 16/2246* (2019.01); *G06F 16/2474* (2019.01); *G06F 16/282* (2019.01); *G06F 16/283* (2019.01)

(58) Field of Classification Search
CPC ... G06F 16/219; G06F 16/2246; G06F 16/282
See application file for complete search history.

(56) References Cited

U.S. PATENT DOCUMENTS 5,574,952 A   11/1996  Brady
5,915,129 A    6/1999  Slivka
(Continued)

FOREIGN PATENT DOCUMENTS

JP    2007531939    11/2007

OTHER PUBLICATIONS

Iankovszky, Andra et al., Edgewater Ranzal, Oracle Platinum Consulting Partner, "The Uncharted Territory Ready to be Discovered: Hybrid Essbase", Hyperion UKOUG, Jun. 18, 2015, 24 pages.
Russakovsky, Alexander; "Hopping over Big Data: Accelerating Ad-hoc OLAP Queries with Grasshopper Algorithms" published Feb. 26, 2015, 30 pages.
"Dynamic Flow process" definition Nov. 26, 2018, google.com, hllps://www.google.com/search?biw=1920&bih=1076&ei=njv8W_CJD4mizwK_I4gCQ&q=%22dynamic+flow+process%22+definition&oq=%22dynamic+flow+process%22+definition&gs I=psy-ab . 3 . . . 38876 .39886 .. 40199 . . . 0 .0 .. 0. 76.437 .8 . . . 0 . . . 1 .. gws-viz . . . Oi71j0i7i30j0i30j0i8i30j33i10.
(Continued)

*Primary Examiner* — Loc Tran
(74) *Attorney, Agent, or Firm* — Tucker Ellis LLP

(57) ABSTRACT

In accordance with an embodiment, described herein are systems and methods for supporting slowly changing dimensions and metadata versioning in a multidimensional database, comprising. A system can comprise a computer that includes one or more microprocessors, and a multidimensional database server executing on the computer, wherein the multidimensional database server supports at least one hierarchical structure of data dimensions. A data dimension can slowly change over time. When such changes occur, metadata associated with the data dimension can be updated. Advantageously, a current snapshot of the data structure can allow searching of previous changes to the slowly changing dimension based upon the metadata.

12 Claims, 11 Drawing Sheets

Related U.S. Application Data

(60) Provisional application No. 62/555,998, filed on Sep. 8, 2017.

(51) Int. Cl.
*G06F 16/22* (2019.01)
*G06F 16/2458* (2019.01)

(56) References Cited

U.S. PATENT DOCUMENTS

| | | | |
|---|---|---|---|
| 6,161,105 | A | 12/2000 | Keighan |
| 6,574,720 | B1 | 6/2003 | Hopeman |
| 6,629,102 | B1 | 9/2003 | Malloy |
| 6,766,325 | B1 | 7/2004 | Pasumansky |
| 6,873,994 | B2 | 3/2005 | Kootale |
| 7,133,876 | B2 | 11/2006 | Roussopoulos |
| 7,392,242 | B1 | 6/2008 | Baccash |
| 7,702,718 | B2 | 4/2010 | Batra |
| 7,792,784 | B2 | 9/2010 | Gupta |
| 8,156,083 | B2 | 4/2012 | Banerjee |
| 8,386,296 | B2 | 2/2013 | Hage |
| 10,083,195 | B2 | 9/2018 | Zhou |
| 10,318,498 | B2 | 6/2019 | Tran |
| 10,346,435 | B2 | 7/2019 | Walker |
| 10,360,527 | B2 | 7/2019 | Abe |
| 10,467,251 | B2 | 11/2019 | Menon |
| 2002/0029207 | A1 | 3/2002 | Bakalash |
| 2003/0005420 | A1 | 1/2003 | Ghosh |
| 2004/0054858 | A1 | 3/2004 | Chandrasekaran |
| 2004/0260671 | A1* | 12/2004 | Potter ............ G06F 16/283 |
| 2005/0223021 | A1 | 10/2005 | Batra |
| 2005/0262108 | A1 | 11/2005 | Gupta |
| 2006/0010159 | A1 | 1/2006 | Mirchandani |
| 2006/0085742 | A1 | 4/2006 | Harold |
| 2006/0106769 | A1 | 5/2006 | Gibbs |
| 2006/0271568 | A1 | 11/2006 | Balkir |
| 2007/0027674 | A1 | 2/2007 | Parson |
| 2007/0061344 | A1 | 3/2007 | Dickerman |
| 2007/0088691 | A1 | 4/2007 | Dickerman |
| 2007/0094668 | A1 | 4/2007 | Jacquot |
| 2008/0288524 | A1 | 11/2008 | Dumitru |
| 2008/0301086 | A1 | 12/2008 | Gupta |
| 2009/0030915 | A1 | 1/2009 | Winter |
| 2009/0248651 | A1 | 10/2009 | Perry |
| 2009/0249125 | A1* | 10/2009 | Bhatawdekar ........ H04L 51/00 714/39 |
| 2009/0276705 | A1 | 11/2009 | Ozdemir |
| 2014/0046920 | A1 | 2/2014 | Shuma |
| 2014/0122413 | A1 | 5/2014 | Presti |
| 2017/0116032 | A1 | 4/2017 | Tran |
| 2017/0116215 | A1 | 4/2017 | Ramaiyer |
| 2017/0116281 | A1 | 4/2017 | Roytman |
| 2017/0116290 | A1 | 4/2017 | Reichman |
| 2017/0116308 | A1 | 4/2017 | Alberg |
| 2017/0116309 | A1 | 4/2017 | Menon |
| 2017/0116310 | A1 | 4/2017 | Walker |
| 2017/0116311 | A1 | 4/2017 | Reichman |
| 2017/0116312 | A1 | 4/2017 | Reichman |
| 2017/0116313 | A1 | 4/2017 | Roytman |
| 2019/0073366 | A1 | 3/2019 | Raimaiyer |
| 2019/0079959 | A1 | 3/2019 | Raimaiyer |
| 2019/0102445 | A1 | 4/2019 | Raimaiyer |
| 2019/0102446 | A1 | 4/2019 | Raimaiyer |
| 2019/0102447 | A1 | 4/2019 | Raimaiyer |
| 2019/0258612 | A1 | 8/2019 | Tran |
| 2019/0286638 | A1 | 9/2019 | Walker |

OTHER PUBLICATIONS

"Dynamic Flow process" OLAP Nov. 26, 2018, google.com, https://www.google.com/search?biw=1920&bih=1076&ei=njv8W_CJD4mizwK_I4gCQ&q=%22dynamic+flow+process%22+definition&oq=%22dynamic+flow+process%22+definition&gs_I=psy-ab . 3 . . . 38876 .39886 .. 40199 . . . 0 .0 .. 0. 76.437 .8 . . . 0 . . . 1 .. gws-viz . . . Oi71j0i7i30j0i30j0i8i30j33i10.

PerformanceArchHowTo, Aggregate Storage Option ASO vs Block Storage Option BSO Contrast and Comparison Aug. 24, 2011, youtube.com, https://www.youtube.com/watch?v=i8AeH5UGT90.

ORACLE ©, Oracle Enterprise Performance Management System Documentation, Release 11.1.2.4/ Essbase, Database Administrator's Guide, Developing Formulas for Block Storage Databases, Copyright © 2019, 28 pages.

Larimer, Mike et al., ORACLE, OAC Essbase Hybrid Block Storage Option Performance Tuning, White Paper, ORACLE ©, Jun. 11, 2018, 24 pages.

ORACLE, Oracle® Cloud, Oracle Cloud Administering Oracle Essbase Cloud, Copyright © 1996, 2016, 632 pages.

ORACLE, Oracle® Cloud, Administering Oracle Analytics Cloud—Essbase, Copyright © 1996, 2017, 703 pages.

Essbase Information Development Team, Oracle® Cloud, Technical Reference for Oracle Analytics Cloud—Essbase, E70189 04, Sep. 2017, Copyright © 1996, 2017, 1044 pages.

EPM Information Development Team, Oracle® Essbase Release 11.1.1, Database Administrator's Guide, Copyright © 1996, 2008, 1182 pages.

EPM Information Development Team, Oracle® Essbase, Technical Reference, Release 11.1.2.2.100, Copyright © 1996, 2012, 1402 pages.

EPM Information Development Team, Oracle® Essbase Database Administrator's Guide, Release 11.1.2.2.100, Updated Dec. 2013, Copyright © 1996, 2013, 1138 pages.

Turrell, Jake, "Introduction to Essbase Hybrid Aggregation Mode", Mar. 4, 2015, 12 pages, retreived on Jan. 15, 2020 from: <http://turrellconsulting.com/blog/?s=introduction+to+essbase+hybrid+aggregation+mode&searchsubmit=U>.

Driscoll, James R. et al., "Making Data Structures Persistent", Journal of Computer and System Sciences, vol. 38, No. 1, Feb. 1989, Printed in Belgium, Copyright © 1989, 39 pages.

Oracle, EPM Information Development Team, Oracle® Integrated Operational Planning, Fusion Edition Release 4.0.1 Installation Guide, Copyright ©2001, 2009, 18 pages.

Oracle, EPM Information Development Team, Oracle® Integrated Operational Planning, Fusion Edition Release 4.0.1 User's Guide, Copyright © 2004, 2009, 272 pages.

Japanese Patent Office, Notice of Reasons of Refusal dated May 11, 2022 for Japanese Patent Application No. 2021-502778 , 3 pages.

ORACLE, ORACLE® Business Intelligence Cloud Service Data Sync, Getting Started, Release 2.2, Sep. 2016, Copyright © 2010, 2016, 6 pages.

ORACLE, ORACLE® Business Intelligence Cloud Service Data Sync, Read Me, Release 2.2, Sep. 2016, Copyright © 2016, 6 pages.

Harvey, Rosie et al., ORACLE® Cloud, Preparing Data in Oracle Business Intelligence Cloud Service, E64760-07, Feb. 2017, Copyright ©2014, 2017, 282 pages.

Williams, Richard, "Configuring the Data Sync Tool for BI Cloud Service (BICS)", Apr. 24, 2015, 20 pages.

Oracle, Loading Data with Oracle BI Cloud Service Data Sync, Tutorial, Copyright © 2015, 34 pages.

\* cited by examiner

```
┌─────────────────────────────────────────────────────────────────────────┐
│ Provide, at a multidimensional database server executing on the computer, at least one least │
│ one hierarchical structure of a plurality of data dimensions, the hierarchical structure comprising │
│ at least two levels, each of the at least two levels comprising at least one data dimension of the │
│                        plurality of data dimensions.                     │
│                                 1110                                    │
└─────────────────────────────────────────────────────────────────────────┘
                                    ▼
┌─────────────────────────────────────────────────────────────────────────┐
│  Track a data dimension of the plurality of data dimensions to observe changes of the data │
│                           dimension over time.                          │
│                                 1120                                    │
└─────────────────────────────────────────────────────────────────────────┘
                                    ▼
┌─────────────────────────────────────────────────────────────────────────┐
│           Update the data dimension upon a change in data dimension.    │
│                                 1130                                    │
└─────────────────────────────────────────────────────────────────────────┘
                                    ▼
┌─────────────────────────────────────────────────────────────────────────┐
│ Persist previous changes to the data dimension based upon metadata associated with the data │
│ dimension, wherein a data dimension of the data dimensions slowly changes over time, wherein │
│ metadata associated with the data dimension is updated upon a change in the slowly changing │
│   data dimension, and wherein the hierarchical structure of data dimensions persists previous │
│   changes to the data dimension based upon the metadata associated with the data dimension. │
│                                 1140                                    │
└─────────────────────────────────────────────────────────────────────────┘
```

*FIGURE 11*

SYSTEM AND METHOD FOR SLOWLY CHANGING DIMENSION AND METADATA VERSIONING IN A MULTIDIMENSIONAL DATABASE ENVIRONMENT

CLAIM OF PRIORITY

This application is a continuation of U.S. Patent Application entitled "SYSTEM AND METHOD FOR SLOWLY CHANGING DIMENSION AND METADATA VERSIONING IN A MULTIDIMENSIONAL DATABASE ENVIRONMENT", application Ser. No. 16/023,802, filed on Jun. 29, 2018, which claims the benefit of priority to U.S. Provisional Patent Application entitled "SYSTEM AND METHOD FOR SLOWLY CHANGING DIMENSION AND METADATA VERSIONING IN A MULTIDIMENSIONAL DATABASE ENVIRONMENT", Application No. 62/555,998, filed on Sep. 8, 2017; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and data warehousing, and are particularly related to a system and method for supporting slowly changing dimension and metadata versioning in a multidimensional database environment.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein is are systems and methods for slowly changing dimension and metadata versioning in a multidimensional database environment. In an exemplary multidimensional database, various dimensions can be provided in a hierarchical (e.g., tree) structure. Some of these dimensions can slowly change over time. Systems and methods can allow for users and/or clients of the multidimensional database to both, at a present time, see a current snapshot of the dimensions within the multidimensional database, but also to view past states of the dimensions.

BRIEF DESCRIPTION OF THE DRAWINGS

FIG. 11 is a flowchart for a method for supporting slowly changing dimensions and metadata versioning in a multidimensional database, in accordance with an embodiment.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Multidimensional database environments, an example of which includes Oracle Essbase, can be used to integrate large amounts of data, in some instances from multiple data sources, and distribute filtered information to end-users, in a manner that addresses those users' particular requirements.

Figure 1:
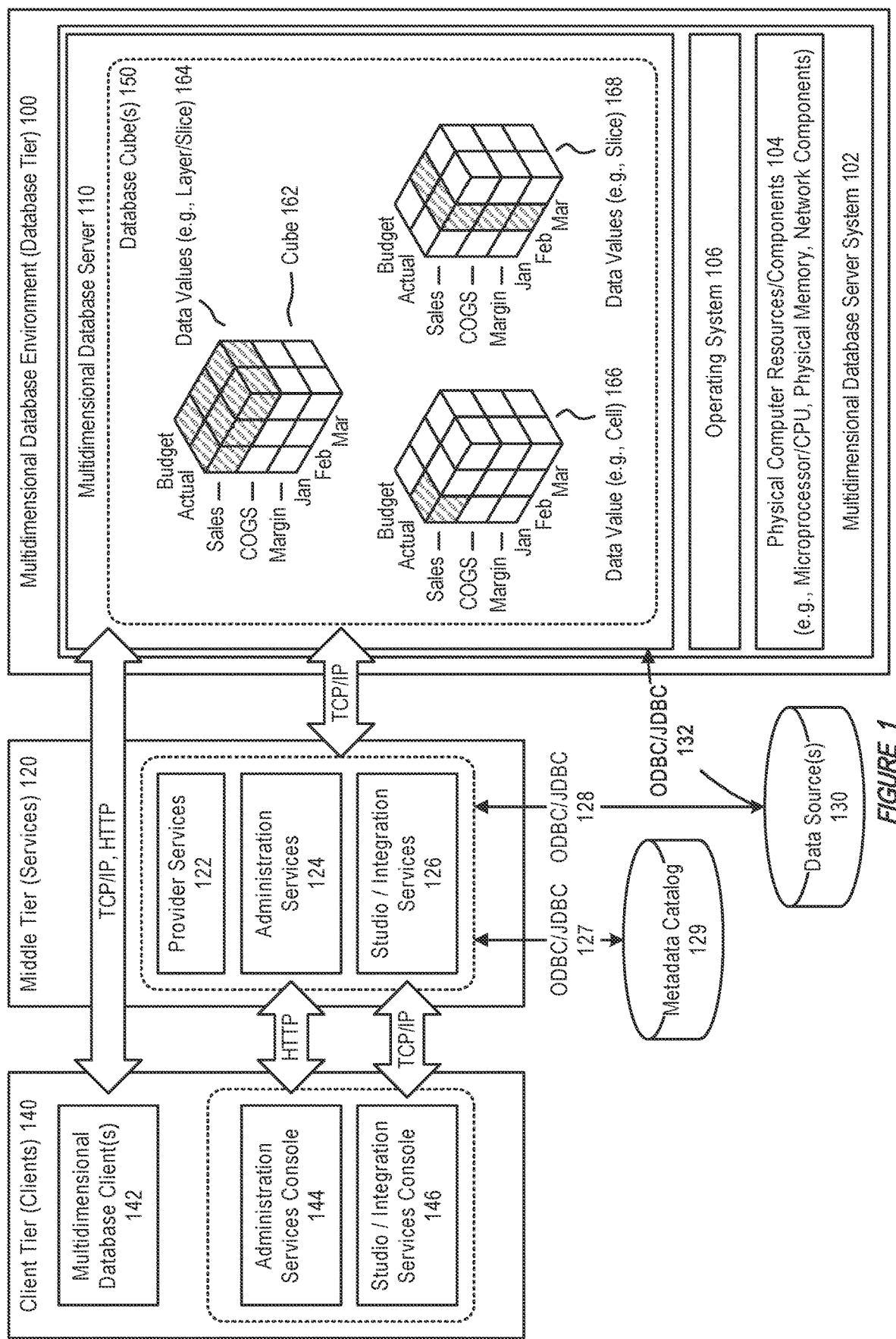
FIG. 1 illustrates an example of a multidimensional database environment, in accordance with an embodiment.

FIG. 1 illustrates an example of a multidimensional database environment 100, in accordance with an embodiment.

As illustrated in FIG. 1, in accordance with an embodiment, a multidimensional database environment, operating as a database tier, can include one or more multidimensional database server system(s) 102, each of which can include physical computer resources or components 104 (e.g., microprocessor/CPU, physical memory, network components), an operating system 106, and one or more multidimensional database server(s) 110 (e.g., Essbase Servers).

In accordance with an embodiment, a middle tier 120 can include one or more service(s), such as, for example, provider services 122 (e.g., Hyperion Provider Services), administration services 124 (e.g., Essbase Administration Services), or studio/integration services 126 (e.g., Essbase Studio/Essbase Integration Services). The middle tier can provide access, via ODBC/JDBC 127, 128, or other types of interfaces, to a metadata catalog 129, and/or one or more data source(s) 130 (for example, a relational database), for use with the multidimensional database environment.

In accordance with an embodiment, the one or more data source(s) can also be accessed, via ODBC/JDBC 132, or other types of interfaces, by the one or more multidimensional database server(s), for use in providing a multidimensional database.

In accordance with an embodiment, a client tier 140 can include one or more multidimensional database client(s) 142 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 144, or a studio/integration services console 146.

In accordance with an embodiment, communication between the client, middle, and database tiers can be provided by one or more of TCP/IP, HTTP, or other types of network communication protocols.

In accordance with an embodiment, the multidimensional database server can integrate data from the one or more data source(s), to provide a multidimensional database, data structure, or cube(s) 150, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as illustrated in FIG. 1, which illustrates a cube 162 that might be used in a sales-oriented business application, when a query indicates "Sales", the system can interpret this query as a slice or layer of data values 164 within the database that contains all "Sales" data values, where "Sales" intersect with "Actual" and "Budget". To refer to a specific data value 166 in a multidimensional database, the query can specify a member on each dimension, for example by specifying "Sales, Actual, January". Slicing the database in different ways, provides different perspectives of the data; for example, a slice of data values 168 for "February" examines all of those data values for which a time/year dimension is fixed for "February".

Database Outline

In accordance with an embodiment, development of a multidimensional database begins with the creation of a database outline, which defines structural relationships between members in the database; organizes data in the database; and defines consolidations and mathematical relationships. Within the hierarchical tree or data structure of the database outline, each dimension comprises one or more members, which in turn may comprise other members. The specification of a dimension instructs the system how to consolidate the values of its individual members. A consolidation is a group of members within a branch of the tree.

Dimensions and Members

In accordance with an embodiment, a dimension represents the highest consolidation level in the database outline. Standard dimensions may be chosen to represent components of a business plan that relate to departmental functions (e.g., Time, Accounts, Product Line, Market, Division). Attribute dimensions, that are associated with standard dimensions, enable a user to group and analyze members of standard dimensions based on member attributes or characteristics. Members (e.g., Product A, Product B, Product C) are the individual components of a dimension.

Dimension and Member Relationships

In accordance with an embodiment, a multidimensional database uses family (parents, children, siblings; descendants and ancestors); and hierarchical (generations and levels; roots and leaves) terms, to describe the roles and relationships of the members within a database outline.

In accordance with an embodiment, a parent is a member that has a branch below it. For example, "Margin" may be a parent for "Sales", and "Cost of Goods Sold" (COGS). A child is a member that has a parent above it. In the above example, "Sales" and "Cost of Goods Sold" are children of the parent "Margin". Siblings are children of the same immediate parent, within the same generation.

In accordance with an embodiment, descendants are members in branches below a parent. For example, "Profit", "Inventory", and "Ratios" may be descendants of Measures; in which case the children of "Profit", "Inventory", and "Ratios" are also descendants of Measures. Ancestors are members in branches above a member. In the above example, "Margin", "Profit", and Measures may be ancestors of "Sales".

In accordance with an embodiment, a root is the top member in a branch. For example, Measures may be the root for "Profit", "Inventory", and "Ratios"; and as such for the children of "Profit", "Inventory", and "Ratios". Leaf (level 0) members have no children. For example, Opening "Inventory", Additions, and Ending "Inventory" may be leaf members.

In accordance with an embodiment, a generation refers to a consolidation level within a dimension. The root branch of the tree is considered to be "generation 1", and generation numbers increase from the root toward a leaf member. Level refers to a branch within a dimension; and are numbered in reverse from the numerical ordering used for generations, with level numbers decreasing from a leaf member toward its root.

In accordance with an embodiment, a user can assign a name to a generation or level, and use that name as a shorthand for all members in that generation or level.

Sparse and Dense Dimensions

Data sets within a multidimensional database often share two characteristics: the data is not smoothly and uniformly distributed; and data does not exist for a majority of member combinations.

In accordance with an embodiment, to address this, the system can recognize two types of standard dimensions: sparse dimensions and dense dimensions. A sparse dimension is one with a relatively low percentage of available data positions filled; while a dense dimension is one in which there is a relatively high probability that one or more cells is occupied in every combination of dimensions. Many multidimensional databases are inherently sparse, in that they lack data values for the majority of member combinations.

Data Blocks and the Index System

In accordance with an embodiment, the multidimensional database uses data blocks and an index to store and access data. The system can create a multidimensional array or data block for each unique combination of sparse standard dimension members, wherein each data block represents the dense dimension members for its combination of sparse dimension members. An index is created for each data block, wherein the index represents the combinations of sparse standard dimension members, and includes an entry or pointer for each unique combination of sparse standard dimension members for which at least one data value exists.

In accordance with an embodiment, when the multidimensional database server searches for a data value, it can use the pointers provided by the index, to locate the appropriate data block; and, within that data block, locate the cell containing the data value.

Administration Services

In accordance with an embodiment, an administration service (e.g., Essbase Administration Services) provides a single-point-of-access that enables a user to design, develop, maintain, and manage servers, applications, and databases.

Studio

In accordance with an embodiment, a studio (e.g., Essbase Studio) provides a wizard-driven user interface for performing tasks related to data modeling, cube designing, and analytic application construction.

Spreadsheet Add-in

In accordance with an embodiment, a spreadsheet add-in integrates the multidimensional database with a spreadsheet, which provides support for enhanced commands such as Connect, Pivot, Drill-down, and Calculate.

Integration Services

In accordance with an embodiment, an integration service (e.g., Essbase Integration Services), provides a metadata-driven environment for use in integrating between the data stored in a multidimensional database and data stored in relational databases.

Provider Services

In accordance with an embodiment, a provider service (e.g., Hyperion Provider Services) operates as a data-source provider for Java API, Smart View, and XMLA clients.

Smart View

In accordance with an embodiment, a smart view provides a common interface for, e.g., Hyperion Financial Management, Hyperion Planning, and Hyperion Enterprise Performance Management Workspace data.

Developer Products

In accordance with an embodiment, developer products enable the rapid creation, management, and deployment of tailored enterprise analytic applications.

Lifecycle Management

In accordance with an embodiment, a lifecycle management (e.g., Hyperion Enterprise Performance Management System Lifecycle Management) provides a means for enabling enterprise performance management products to migrate an application, repository, or individual artifacts across product environments.

OLAP

In accordance with an embodiment, an online analytical processing (OLAP) provides an environment that enables users to analyze enterprise data. For example, finance departments can use OLAP for applications such as budgeting, activity-based costing, financial performance analysis, and financial modeling, to provide "just-in-time" information.

In accordance with an embodiment, OLAP systems can organize data in multiple dimensions allows searchers/users of the data set to conduct directed searches that traverse various dimensions to ultimately arrive at the result of interest. OLAP systems can view data as residing at the intersection of dimensions. Put another way, the data underlying OLAP systems can be organized and stored as a multi-dimensional database which is an instantiation of the cross-product of all of the dimensions. This allows users/searchers to traverse hierarchies of detail along dimensions of interest in an ad hoc manner to get at specific, targeted data. Slowly changing data can be represented as metadata within a current data set.

Supporting Slowly Changing Dimension and Metadata Versioning

Figure 2:
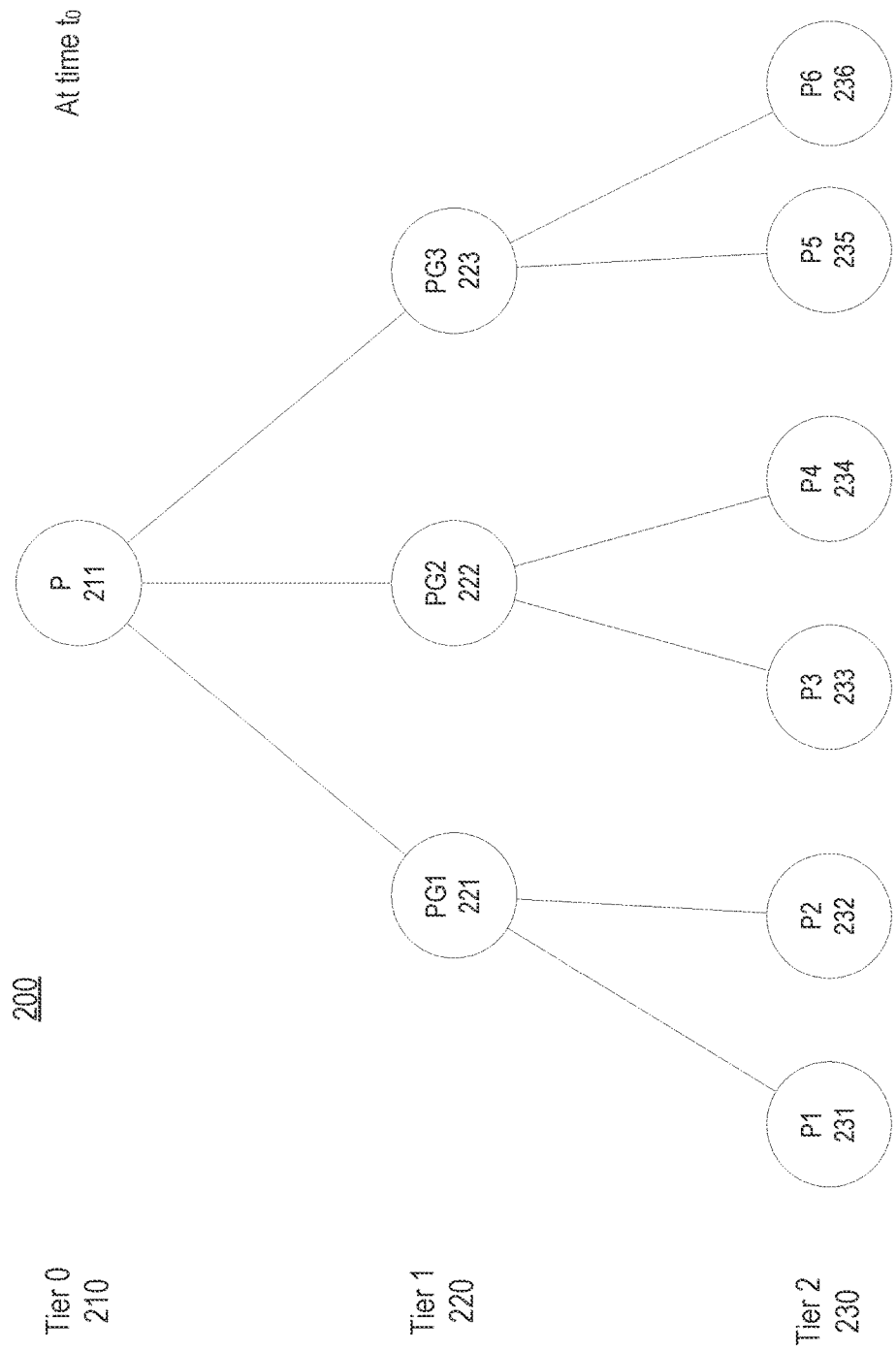
FIG. 2 shows an exemplary multidimensional database, where the database has a set of dimensions in a parent/child hierarchy in a recursive manner.

An exemplary multidimensional database, where the database has a set of dimensions in a parent/child hierarchy in a recursive manner, is shown in FIG. 2.

For example, FIG. 2 illustrates an exemplary hierarchal data structure 200 having three tiers, tier 0 210, tier 1 220, and tier 2 230. In accordance with an embodiment, for example, tier 0 can contain data dimension P 211. Data dimension P can represent, for example, a product family or a company. –Tier 1 210 can contain a number of dimensions as well, such as data dimensions PG1 221, PG2 222, and PG3 223, which are associated with the dimension P via the links or relationships shown in the figure. In continuing the example, from data dimension P, data dimensions PG1, PG2, and PG3 can represent, for example, product groups. Tier 2 230 can contain a number of data dimensions as well, such as P1 231, P2 232, P3 233, P4 234, P5 235, and P6 236, which are associated with the dimensions PG1, PG2, and PG3 (respectively) via the links or relationships shown in the figure. In continuing the example, from data dimension P, and data dimensions PG1, PG2, and PG3, data dimensions, P1, P2, P3, P4, P5, and P6, can represent, for example, products within the product groups represented by PG1, PG2, and PG3.

In accordance with an embodiment, the hierarchal data structure having three tiers shown in the figure can represent an initial point at time to, which can represent, for example, an initial load of data into a database, such as the multidimensional database server 110 as depicted in FIG. 1.

In accordance with an embodiment, the data dimensions (i.e., P, PG1-PG3, and P1-6) can be associated via links or relationships, which can be embodied by metadata. For example, the relationship between PG1 221 and P 211 can be defined by a metadata relationship stored at a database, such as the multidimensional database server 110 as depicted in FIG. 1.

In accordance with an embodiment, the dimensions shown in the figure can represent slowly changing dimensions (i.e., dimensions that slowly change over time). Examples of such slowly changing dimensions can include, for example, salary information, product cost information, personnel information.

While data structures such as that shown in FIG. 2 can be useful for displaying a current snapshot of up-to-date information (e.g., what is the current salary for each member o a team), such data structures are not as useful when the desired information is about a previous time (e.g., what was the salary for each member of a team 2 years ago).

In accordance with an embodiment, and as shown and described in more detail below, by using and updating the metadata information that defines relationships between members of various data dimensions, the data structure of FIG. 2 can be used to quickly and easily represent not only a current snapshot of the data structure, but it can also represent each change of a data dimension from a set point in time. This provides the advantage that a single data structure can display current and past information about changing data dimensions versus having to take and save (e.g., archive) a snapshot each time any data dimension of the data structure changes (e.g., saves compute time as well as storage space).

Figure 3:
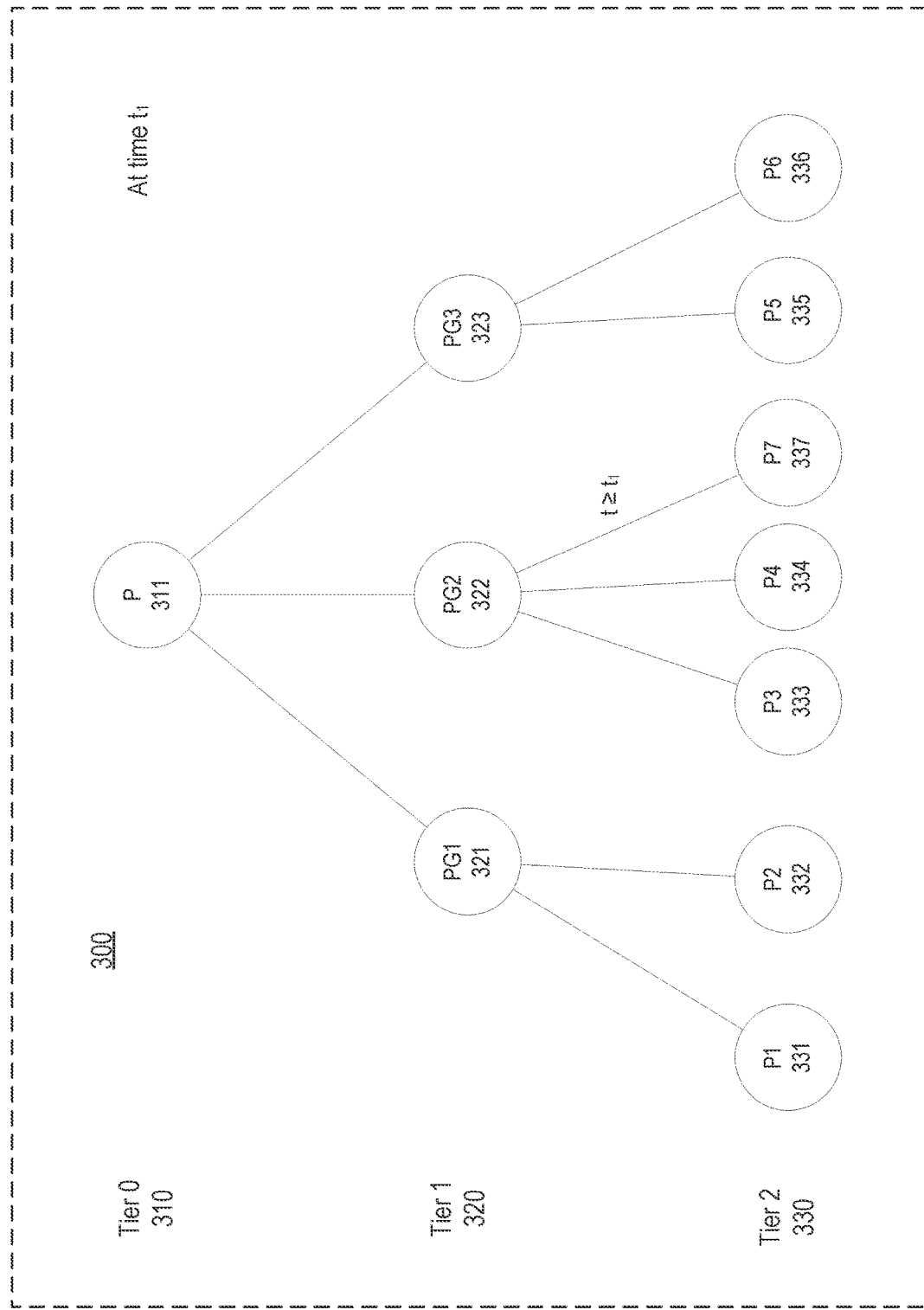
FIG. 3 shows an exemplary multidimensional database, where the database has a set of dimensions in a parent/child hierarchy in a recursive manner.

An exemplary multidimensional database, where the database has a set of dimensions in a parent/child hierarchy in a recursive manner, is shown in FIG. 3.

For example, FIG. 3 illustrates an exemplary hierarchal data structure 300 having three tiers, tier 0 310, tier 1 320, and tier 2 330. In accordance with an embodiment, for example, tier 0 can contain data dimension P 311. Data dimension P can represent, for example, a product family or a company. Tier 1 310 can contain a number of dimensions as well, such as data dimensions PG1 321, PG2 322, and PG3 323, which are associated with the dimension P via the links or relationships shown in the figure. In continuing the example, from data dimension P, data dimensions PG1, PG2, and PG3 can represent, for example, product groups. Tier 2 330 can contain a number of data dimensions as well, such as P1 331, P2 332, P3 333, P4 334, P5 335, and P6 336, which are associated with the dimensions PG1, PG2, and PG3 (respectively) via the links or relationships shown in the figure. In continuing the example, from data dimension P, and data dimensions PG1, PG2, and PG3, data dimensions, P1, P2, P3, P4, P5, and P6, can represent, for example, products within the product groups represented by PG1, PG2, and PG3.

In accordance with an embodiment, tier 1 can contain a number of dimensions as well, such as PG1, PG2, and PG3, which are associated with the dimension P via the links or relationships shown in the figure. These dimensions, PG1, PG2, and PG3 can represent, for example, product groups.

In accordance with an embodiment, tier 2 can contain a number of dimensions as well, such as P1, P2, P3, P4, P5, P6, and P7 which are associated with the dimensions PG1, PG2, and PG3 (respectively) via the links or relationships shown in the figure. These dimensions, P1, P2, P3, P4, P5, P6, and P7 can represent, for example, products within the shown product groups (e.g., P7 is a new product recently added to product group PG2).

In accordance with an embodiment, the hierarchal data structure having three tiers shown in the figure can represent a further point in time $t_1$, which can represent, for example, the data structure of FIG. 2 at a later point in time ($t_1$).

In accordance with an embodiment, at this later point in time $t_1$, a new dimension of tier 2 can be added, P7. When dimension P7 is added to PG2, the metadata associated with the link or relationship between P7 and PG2 can be updated such that the metadata indicates that such relationship between P7 and PG2 is valid only for time greater than or equal to time $t_1$.

Figure 4:
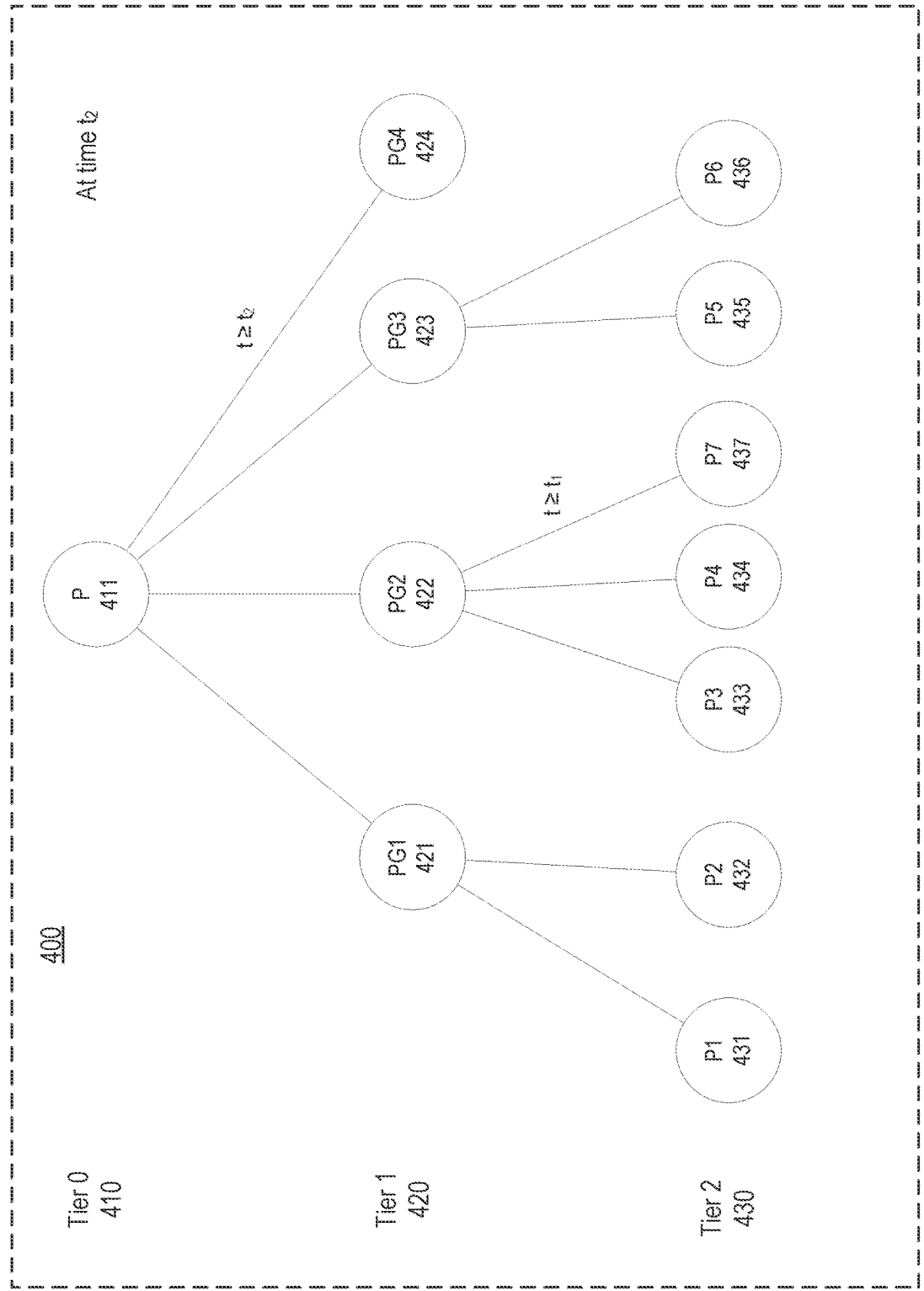
FIG. 4 shows an exemplary multidimensional database, where the database has a set of dimensions in a parent/child hierarchy in a recursive manner.

An exemplary multidimensional database, where the database has a set of dimensions in a parent/child hierarchy in a recursive manner, is shown in FIG. 4.

For example, FIG. 4 illustrates an exemplary hierarchal data structure 400 having three tiers, tier 0 410, tier 1 420, and tier 2 430. In accordance with an embodiment, for example, tier 0 can contain data dimension P 411. Data dimension P can represent, for example, a product family or a company. Tier 1 410 can contain a number of dimensions as well, such as data dimensions PG1 421, PG2 422, PG3 423, and PG4 424 which are associated with the dimension P via the links or relationships shown in the figure. In continuing the example, from data dimension P, data dimensions PG1, PG2, and PG3 can represent, for example, product groups. Tier 2 430 can contain a number of data dimensions as well, such as P1 431, P2 432, P3 433, P4 434, P5 435, P6 436, and P7 437 (which was added to dimension PG2 at time $t_1$) which are associated with the dimensions PG1, P2G, and PG3 (respectively) via the links or relationships shown in the figure. In continuing the example, from data dimension P, and data dimensions PG1, PG2, and PG3, data dimensions, P1, P2, P3, P4, P5, P6, and P7 can represent, for example, products within the product groups represented by PG1, PG2, and PG3.

Tier 1 can contain a number of dimensions as well, such as PG1, PG2, PG3, and PG4 (e.g., a newly added product group) which are associated with the dimension P via the links or relationships shown in the figure. These dimensions, PG1, PG2, PG3, and PG4 can represent, for example, product groups.

Tier 2 can contain a number of dimensions as well, such as P1, P2, P3, P4, P5, P6, and P7 which are associated with the dimensions PG1, PG2, and PG3 (respectively) via the links or relationships shown in the figure. These dimensions, P1, P2, P3, P4, P5, P6, and P7 can represent, for example, products within the shown product groups.

In accordance with an embodiment, the hierarchal data structure having three tiers shown in the figure can represent a further point in time $t_2$, which can represent, for example, the data structures of FIG. 2 and FIG. 3 at a later point in time ($t_2$).

In accordance with an embodiment, at this later point in time $t_2$, a new dimension of tier 1 can be added, PG4 424. When dimension PG4 is added to P, the metadata associated with the link or relationship between PG4 and P can be tagged/marked/updated such that the metadata indicates that such relationship between PG4 and P is valid only for time greater than or equal to time $t_2$.

In accordance with an embodiment, the metadata associated with the prior change at $t_1$ (the addition of P7 to PG2) can be persisted by the hierarchical data structure.

Figure 5:
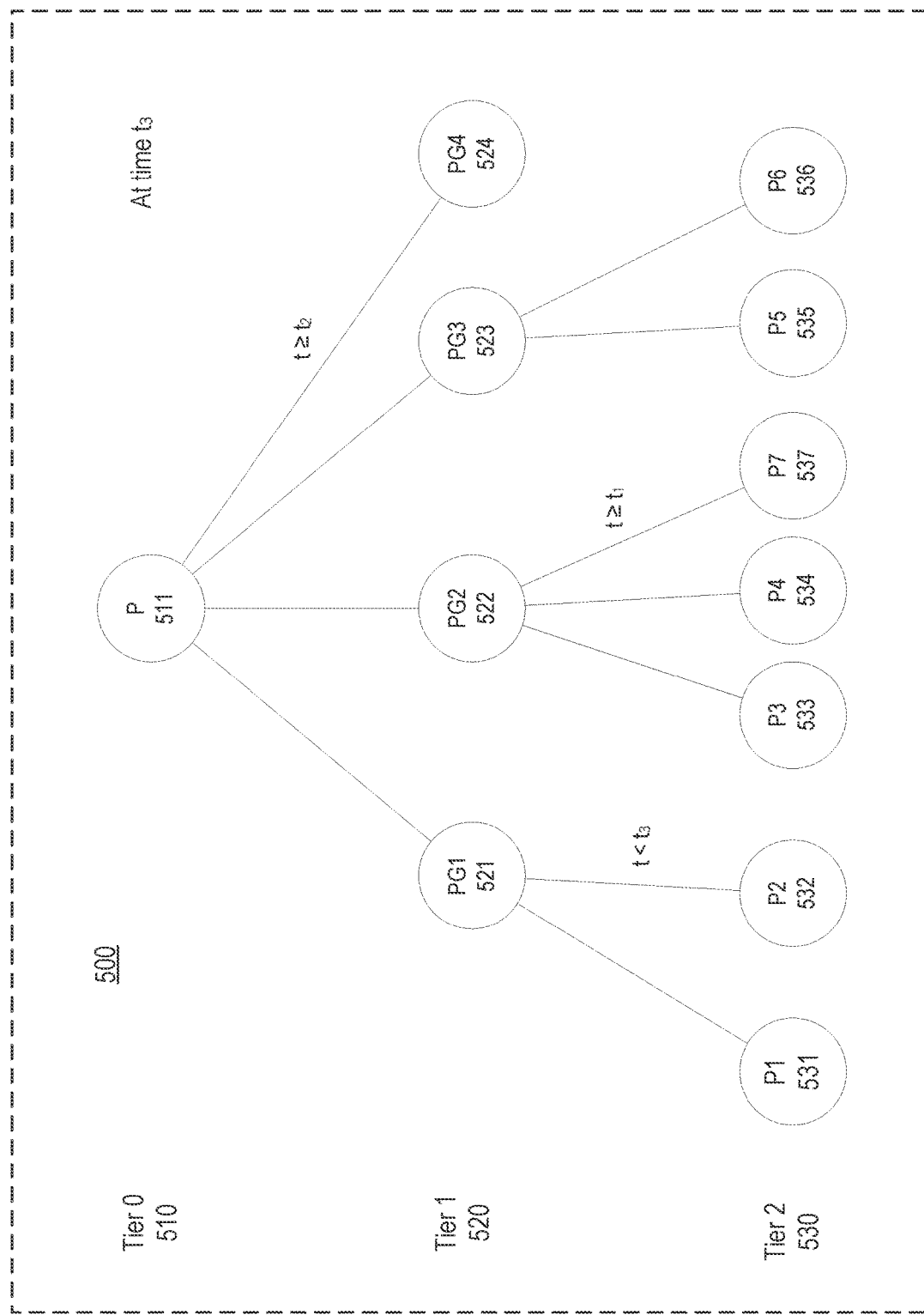
FIG. 5 shows an exemplary multidimensional database, where the database has a set of dimensions in a parent/child hierarchy in a recursive manner.

An exemplary multidimensional database, where the database has a set of dimensions in a parent/child hierarchy in a recursive manner, is shown in FIG. 5.

For example, FIG. 5 illustrates an exemplary hierarchal data structure 500 having three tiers, tier 0 510, tier 1 520, and tier 2 530. In accordance with an embodiment, for example, tier 0 can contain data dimension P 511. Data dimension P can represent, for example, a product family or a company. Tier 1 510 can contain a number of dimensions as well, such as data dimensions PG1 521, PG2 522, PG3 523, and PG4 524 which are associated with the dimension P via the links or relationships shown in the figure. In continuing the example, from data dimension P, data dimensions PG1, PG2, PG3, and PG4 can represent, for example, product groups. Tier 2 530 can contain a number of data dimensions as well, such as P1-P7 531-537 (P7 having been added to dimension PG2 at time $t_1$) which are associated with the dimensions PG1, PG2, and PG3 (respectively) via the links or relationships shown in the figure. In continuing the example, from data dimension P, and data dimensions PG1, PG2, and PG3, data dimensions, P1, P2, P3, P4, P5, P6, and P7 can represent, for example, products within the product groups represented by PG1, PG2, and PG3.

In accordance with an embodiment, tier 1 can contain a number of dimensions as well, such as PG1, PG2, PG3, and PG4 (PG4 having been added at time $t_2$) which are associated with the dimension P via the links or relationships shown in the figure. These dimensions, PG1, PG2, PG3, and P4 can represent, for example, product groups.

In accordance with an embodiment, tier 2 can contain a number of dimensions as well, such as P1, P2, P3, P4, P5, P6, and P7 which are associated with the dimensions PG1, PG2, and PG3 (respectively) via the links or relationships shown in the figure. These dimensions, P1, P2, P3, P4, P5, P6, and P7 can represent, for example, products within the shown product groups.

In accordance with an embodiment, the hierarchal data structure having three tiers shown in the figure can represent a further point in time $t_3$, which can represent, for example, the data structures of FIGS. 2, 3, and 4 at a later point in time ($t_3$).

In accordance with an embodiment, at this later point in time $t_3$, dimension P2 of tier 1 can be removed from PG1. When dimension P2 is removed from PG1, the metadata associated with the link or relationship between P2 and PG1 can be updated such that the metadata indicates that such relationship between P2 and PG1 is valid only for times less than time $t_3$. As such, the metadata associated with the link or relationship between PG1 and P2 can be tagged/marked/updated such that the metadata indicates that such relationship between PG2 and P2 is valid only for times less than $t_3$.

In accordance with an embodiment, the metadata associated with the prior changes at $t_1$ and $t_2$ can be persisted by the hierarchical data structure.

Figure 6:
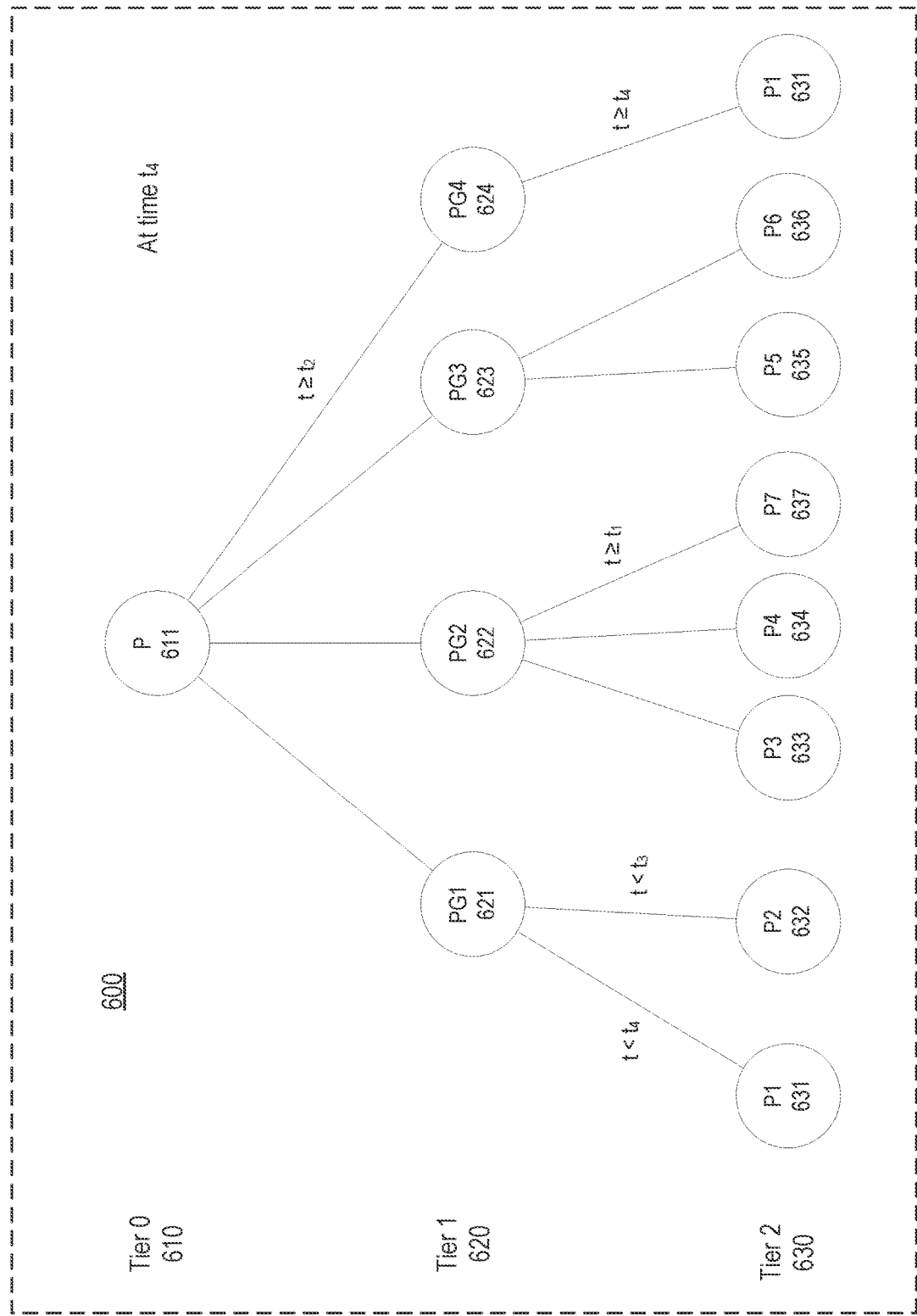
FIG. 6 shows an exemplary multidimensional database, where the database has a set of dimensions in a parent/child hierarchy in a recursive manner.

An exemplary multidimensional database, where the database has a set of dimensions in a parent/child hierarchy in a recursive manner, is shown in FIG. 6.

For example, FIG. 6 illustrates an exemplary hierarchal data structure 600 having three tiers, tier 0 610, tier 1 620, and tier 2 630. In accordance with an embodiment, for example, tier 0 can contain data dimension P 611. Data dimension P can represent, for example, a product family or a company. Tier 1 610 can contain a number of dimensions as well, such as data dimensions PG1 621, PG2 622, PG3 623, and PG4 624 which are associated with the dimension P via the links or relationships shown in the figure. In continuing the example, from data dimension P, data dimensions PG1, PG2, PG3, and PG4 can represent, for example, product groups. Tier 2 630 can contain a number of data dimensions as well, such as P1-P7 631-637 (P7 having been added to dimension PG2 at time $t_1$) which are associated with the dimensions PG1, PG2, and PG3 (respectively) via the links or relationships shown in the figure. In continuing the example, from data dimension P, and data dimensions PG1, PG2, and PG3, data dimensions, P1, P2, P3, P4, P5, P6, and P7 can represent, for example, products within the product groups represented by PG1, PG2, and PG3.

In accordance with an embodiment, tier 1 can contain a number of dimensions as well, such as PG1, PG2, PG3, and PG4 which are associated with the dimension P via the links or relationships shown in the figure. These dimensions, PG1, PG2, PG3, and PG4 can represent, for example, product groups.

In accordance with an embodiment, tier 2 can contain a number of dimensions as well, such as P1, P2, P3, P4, P5, P6, and P7 which are associated with the dimensions PG1, PG2, and PG3 (respectively) via the links or relationships shown in the figure. These dimensions, P1, P2, P3, P4, P5, P6, and P7 can represent, for example, products within the shown product groups.

In accordance with an embodiment, the hierarchal data structure having three tiers shown in the figure can represent a further point in time $t_4$, which can represent, for example, the data structures of FIGS. 2, 3, 4, and 5 at a later point in time ($t_4$).

In accordance with an embodiment, at this later point in time $t_4$, dimension P1 of tier 2 can be removed from PG1 and moved to PG4. When dimension P1 is moved from PG1 to PG4, the metadata associated with the link or relationship between P1 and PG1 can be updated such that the metadata indicates that such relationship between P1 and PG1 is valid only for time less than time $t_4$. As well, a new link or relationship between P1 and PG4 can be created with metadata showing that such link or relationship between slowly changing dimensions is only valid for time greater than $t_4$.

In accordance with an embodiment, the metadata associated with the prior changes at $t_1$, $t_2$ and $t_3$ can be persisted by the hierarchical data structure.

Figure 7:
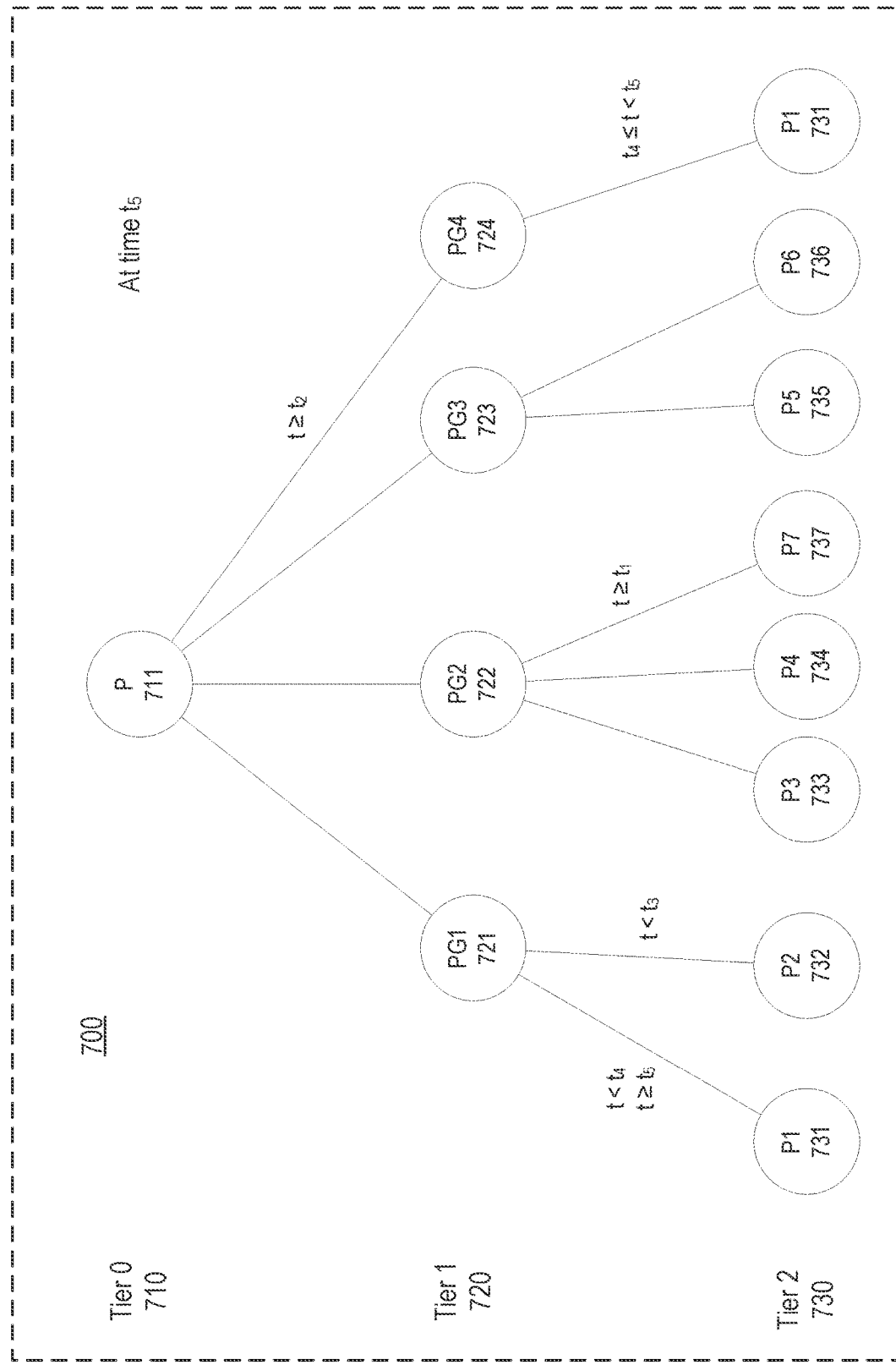
FIG. 7 shows an exemplary multidimensional database, where the database has a set of dimensions in a parent/child hierarchy in a recursive manner.

An exemplary multidimensional database, where the database has a set of dimensions in a parent/child hierarchy in a recursive manner, is shown in FIG. 7.

For example, FIG. 7 illustrates an exemplary hierarchal data structure 700 having three tiers, tier 0 710, tier 1 720, and tier 2 730. In accordance with an embodiment, for example, tier 0 can contain data dimension P 711. Data dimension P can represent, for example, a product family or a company. Tier 1 710 can contain a number of dimensions as well, such as data dimensions PG1 721, PG2 722, PG3 723, and PG4 724 which are associated with the dimension P via the links or relationships shown in the figure. In continuing the example, from data dimension P, data dimensions PG1, PG2, PG3, and PG4 can represent, for example, product groups. Tier 2 730 can contain a number of data dimensions as well, such as P1-P7 731-737 (P7 having been added to dimension PG2 at time $t_1$) which are associated with the dimensions PG1, PG2, PG3, and PG4 (respectively) via the links or relationships shown in the figure. In continuing the example, from data dimension P, and data dimensions PG1, PG2, and PG3, data dimensions, P1, P2, P3, P4, P5, P6, and P7 can represent, for example, products within the product groups represented by PG1, PG2, PG3, PG4.

In accordance with an embodiment, tier 1 can contain a number of dimensions as well, such as PG1, PG2, PG3, and P4 which are associated with the dimension P via the links or relationships shown in the figure. These dimensions, PG1, PG2, PG3, and P4 can represent, for example, product groups.

In accordance with an embodiment, tier 2 can contain a number of dimensions as well, such as P1, P2, P3, P4, P5, P6, and P7 which are associated with the dimensions PG1, PG2, PG3, and PG4 (respectively) via the links or relationships shown in the figure. These dimensions, P1, P2, P3, P4, P5, P6, and P7 can represent, for example, products within the shown product groups.

In accordance with an embodiment, the hierarchal data structure having three tiers shown in the figure can represent a further point in time $t_5$, which can represent, for example, the data structures of FIGS. 2, 3, 4, 5, and 6 at a later point in time ($t_5$).

In accordance with an embodiment, at this later point in time $t_5$, dimension P1 of tier 1 can be removed from PG4 and moved to PG1. When dimension P1 is moved from PG4 to PG1, the metadata associated with the link or relationship between P1 and PG4 can be updated such that the metadata indicates that such relationship between P1 and PG4 is valid only for time greater than or equal to $t_4$ and less than $t_5$. As well, the link or relationship between P1 and PG1 can be updated with metadata showing that such link or relationship between slowly changing dimensions is valid for times less than $t_4$ and greater than or equal to $t_5$.

In accordance with an embodiment, the metadata associated with the prior changes at $t_1$, $t_2$, $t_3$, and $t_4$ can be persisted by the hierarchical data structure.

Figure 8:
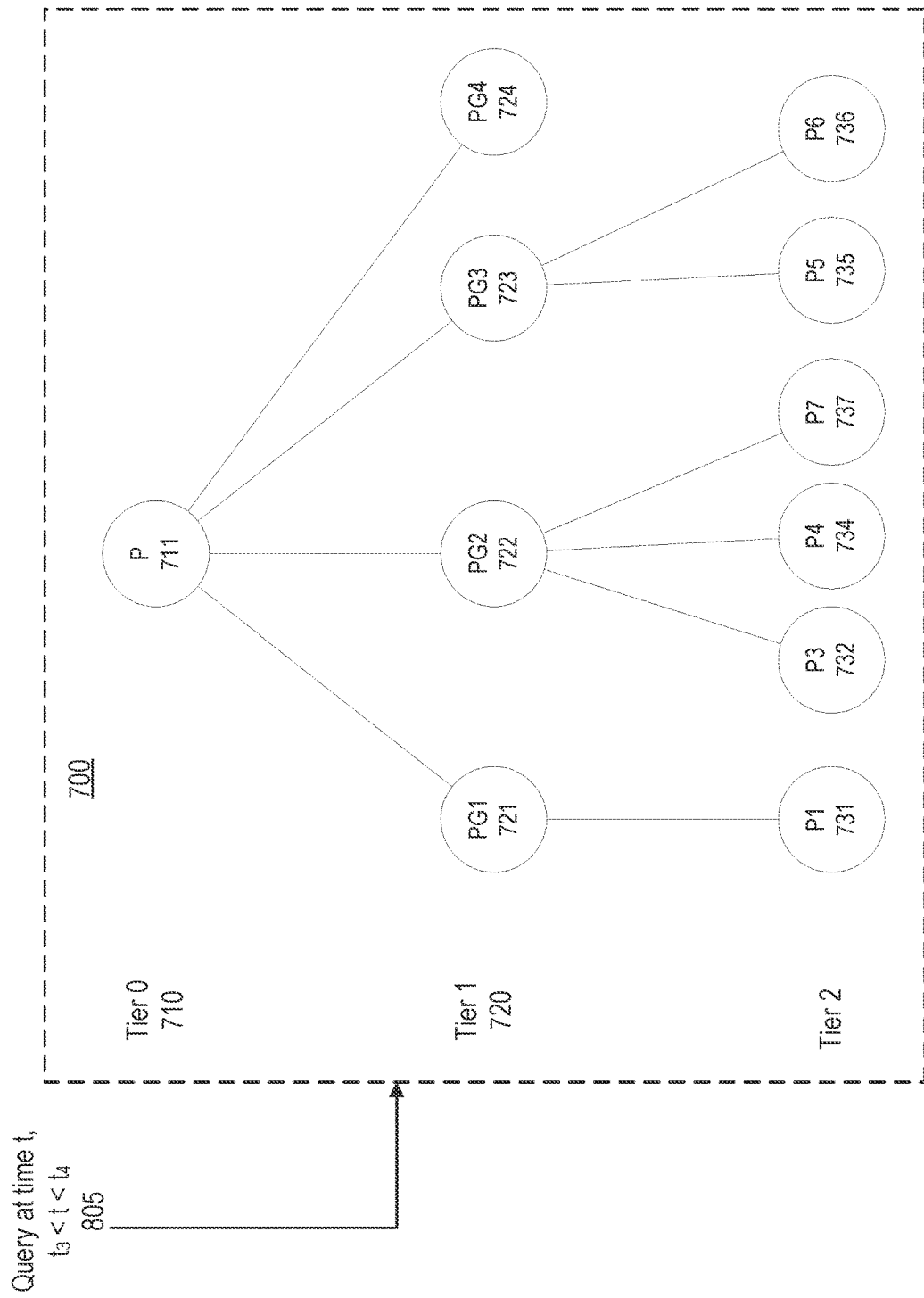
FIG. 8 illustrates a system for supporting slowly changing dimension and metadata versioning in a multidimensional database environment, in accordance with an embodiment.

FIG. 8 illustrates a system for supporting slowly changing dimension and metadata versioning in a multidimensional database environment, in accordance with an embodiment.

More specifically, the figure shows a result of a query for the exemplary multidimensional database of FIG. 7 at time "t", wherein t is between $t_3$ and $t_4$.

In accordance with an embodiment, upon receiving a query for a multidimensional database that supports slowly changing dimensions at a time "t", the metadata associated with the link or relationships can show which link or relationships are valid for the queried time.

In accordance with the depicted embodiment, for example, P1 will be displayed as being associated or linked with PG1 only, as the relationship for P1 and PG4 is valid only for times greater than or equal to $t_4$ and less than $t_5$ time. Likewise, P2, in the query result, is removed from the link or relationship between P2 and PG1 is only valid for times less than $t_3$.

In accordance with an embodiment, while such a query will return a view of the exemplary hierarchal data structure as depicted in FIG. 8, the underlying hierarchal data structure of FIG. 7 is still stored in memory.

In accordance with an embodiment, the space required in memory for a data structure as described above (i.e., a data structure supporting slowly changing dimensions) can be represented as a linear function: space required=O(n+m), where "n" is an initial size of the data structure (e.g., at "time zero" or "$t_0$"), and "m" is the number of changes. Thus the space required in memory for such a data structure increases linearly as the number of changes increases. This represents an improvement over other methods wherein the space required for such a data structure is represented as a product: space required=O(nm) (i.e., the space required is the initial size of the data structure multiplied by the number of changes).

Figure 9:
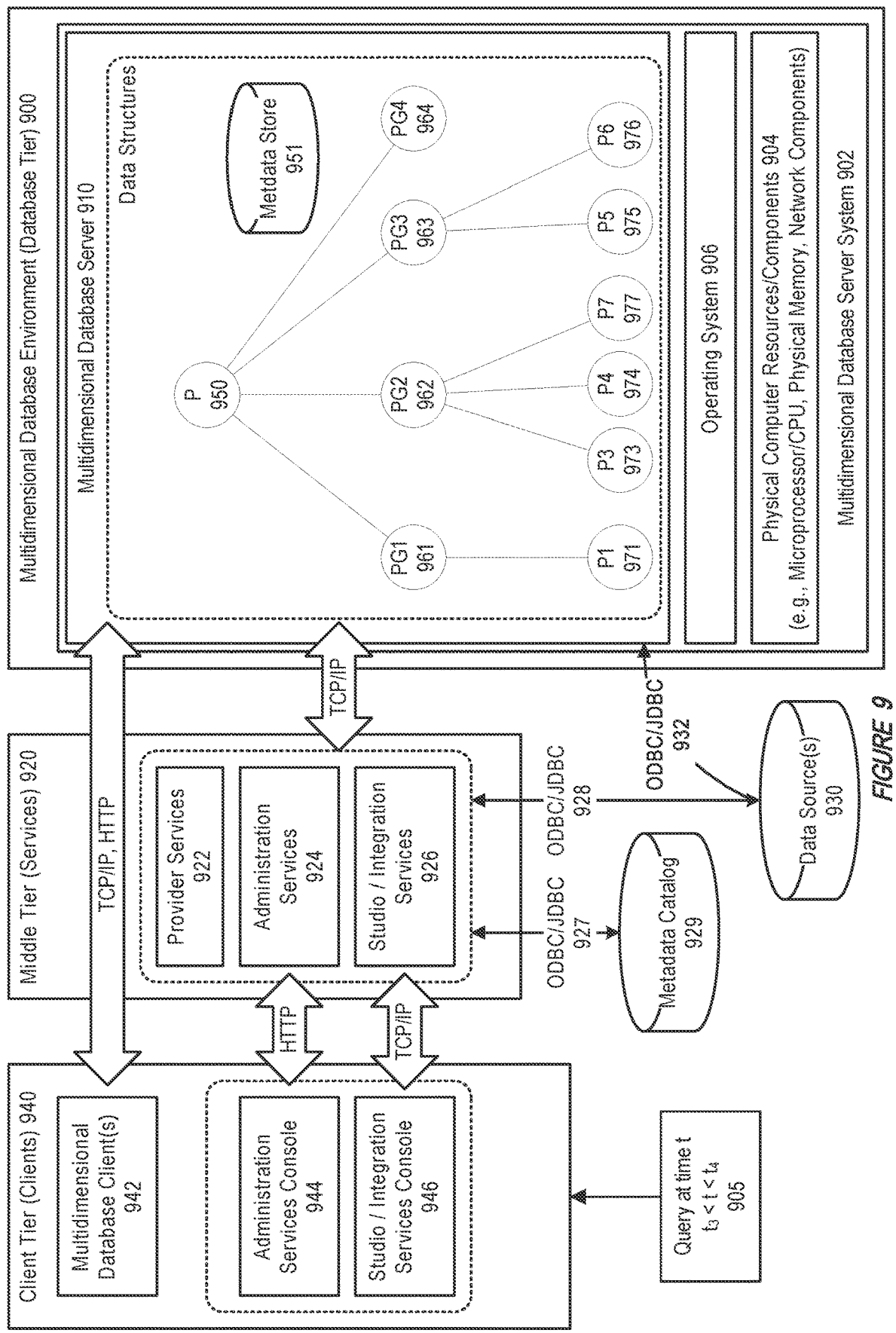
FIG. 9 illustrates an example of supporting slowly changing data dimensions in a multidimensional database environment, in accordance with an embodiment.

FIG. 9 illustrates an example of supporting slowly changing data dimensions in a multidimensional database environment 900, in accordance with an embodiment.

As illustrated in FIG. 9, in accordance with an embodiment, a multidimensional database environment, operating as a database tier, can include one or more multidimensional database server system(s) 902, each of which can include physical computer resources or components 904 (e.g., microprocessor/CPU, physical memory, network components), an operating system 906, and one or more multidimensional database server(s) 910 (e.g., Essbase Servers).

In accordance with an embodiment, a middle tier 920 can include one or more service(s), such as, for example, provider services 922 (e.g., Hyperion Provider Services), administration services 924 (e.g., Essbase Administration Services), or studio/integration services 926 (e.g., Essbase Studio/Essbase Integration Services). The middle tier can provide access, via ODBC/JDBC 927, 928, or other types of interfaces, to a metadata catalog 929, and/or one or more data source(s) 930 (for example, a relational database), for use with the multidimensional database environment.

In accordance with an embodiment, the one or more data source(s) can also be accessed, via ODBC/JDBC 932, or other types of interfaces, by the one or more multidimensional database server(s), for use in providing a multidimensional database.

In accordance with an embodiment, a client tier 940 can include one or more multidimensional database client(s) 942 (e.g., Essbase Server clients), that enable access to a multidimensional database (such as, for example, Smart View, Spreadsheet Add-in, Smart Search, Administration Services, MaxL, XMLA, CAPI or VB API Applications, Oracle Business Intelligence Enterprise Edition Plus, or other types of multidimensional database clients). The client tier can also include consoles, for use with services in the middle tier, such as for example an administration services console 944, or a studio/integration services console 946.

In accordance with an embodiment, communication between the client, middle, and database tiers can be provided by one or more TCP/IP, HTTP, or other types of network communication protocols.

In accordance with an embodiment, the multidimensional database server can integrate data from the one or more data source(s), to provide a multidimensional database, data structure, or cube(s) 950, which can then be accessed to provide filtered information to end-users.

Generally, each data value in a multidimensional database is stored in one cell of a cube; and a particular data value can be referenced by specifying its coordinates along dimensions of the cube. The intersection of a member from one dimension, with a member from each of one or more other dimensions, represents a data value.

For example, as shown in FIG. 9, the multidimensional database is displayed as a hierarchical structure (a flattened view which is shown in the figure shows a tree/hierarchical data structure). The data structure shown in the Figure is the data structure of FIG. 7, which has been queried 905 by a client at the client tier, the query requesting the data structure of FIG. 7 at time t, t being more than $t_3$, but less than $t_4$. As shown, by utilizing the metadata information, which can be stored at the metadata store 951. (Although the metadata store is shown as being within the same environment as the data structure, one of skill in the art would appreciate that the metadata store does not have to be local to the data structure, and can instead be accessed (writes and reads) at a remote location). The data structure then collapses to a data structure having 3 tiers, tier 0 comprising dimension P 950, tier 1 comprising PG1 961, PG2 962, PG3 963, and PG4 964. At tier 2, dimension P1 971 is the sole child relationship of PG1, dimensions P3 973, P4 974, and P7 977 are the children of PG2, dimensions P5 975 and P6 976 are the children of PG3, and PG4 is childless at queried time.

Note that, for example, if the query were for a different time, the data structure could collapse, based upon the metadata information associated with each link between data dimensions, into a different configuration. In this way, a single, queryable data structure is provided that, based upon a received query, can provide a snapshot of the data structure at any time (assuming that metadata information was written for each link revision/update).

Figure 10:
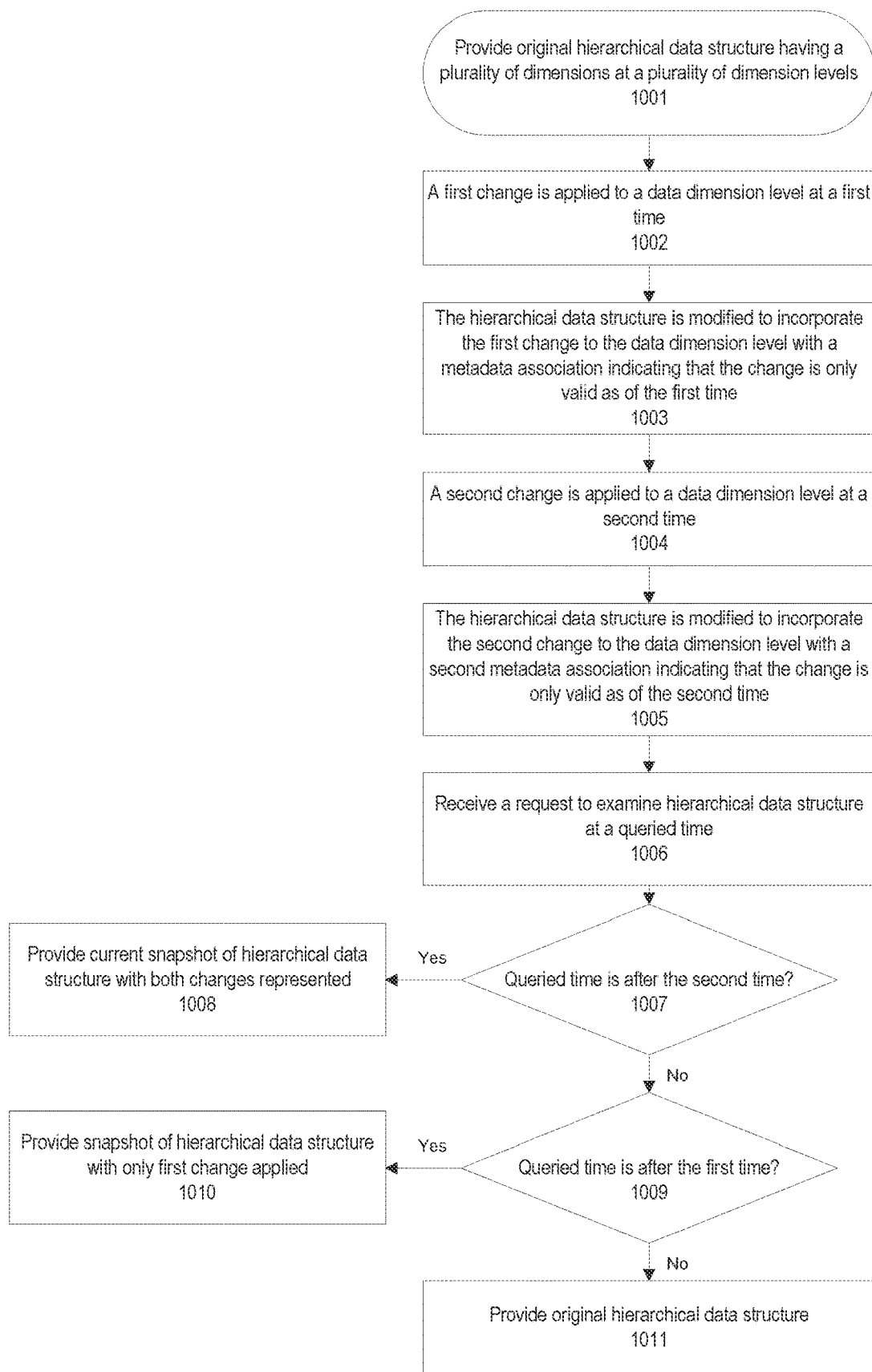
FIG. 10 is a flowchart for a method for supporting slowly changing dimension and metadata versioning in a multidimensional database environment, in accordance with an embodiment.

FIG. 10 is a flowchart for a method for supporting slowly changing dimension and metadata versioning in a multidimensional database environment, in accordance with an embodiment.

More particularly, FIG. 10 illustrate a method for querying a hierarchical data structure comprising metadata versioning and slowly changing dimensions, in accordance with an embodiment.

In accordance with an embodiment, at step 1001, an original hierarchical data structure can be provided. This original version can comprise a number of data dimensions organized into a number of dimension levels.

In accordance with an embodiment, at step 1002, a first change, at a first time, can be applied to the hierarchical data structure. At step 1003, this first change can be incorporated into the hierarchical data structure, with the change being associated by a relationship between two levels of the hierarchical data structure having a metadata tag indicative of the first time. This metadata tag can indicate that such a first change is valid only as of the first time.

In accordance with an embodiment, at step 1004, a second change, at a second, later, time, can be applied to the hierarchical data structure. At step 1005, this second change can be incorporated into the hierarchical data structure, with the change being associated by a relationship between two levels of the hierarchical data structure having a metadata tag indicative of the second time. This metadata tag can indicate that such a second change is valid only as of the second time.

In accordance with an embodiment, at step 1006, a request can be received, wherein the request is to examine the hierarchical data structure as of a certain, queried time.

In accordance with an embodiment, at step 1007, the method can determine if the queried time is after the second time. If so, then at step 1008, then the current snapshot of the hierarchical data structure can be provided, the current snapshot reflective of both the first change and the second change.

In accordance with an embodiment, at step 1009, if the queried time is not after the second time, the method can determine if the queried time is after the first time. On determining that the queried time is before the second time, but after the first time, then at step 1010, a different snapshot of the hierarchical data structure can be provided. This different snapshot is reflective of only the first change (as the second change is not valid as of times earlier than the second change).

In accordance with an embodiment, at step 1011, if the queried time is before the first time, then the original hierarchical data structure can be provided as neither the first change nor the second change are valid.

FIG. 11 is a flowchart for a method for supporting slowly changing dimensions and metadata versioning in a multidimensional database, in accordance with an embodiment.

At step 1110, the method can provide, at a multidimensional database server executing on the computer, at least one least one hierarchical structure of a plurality of data dimensions, the hierarchical structure comprising at least two levels, each of the at least two levels comprising at least one data dimension of the plurality of data dimensions.

At step 1120, the method can track a data dimension of the plurality of data dimensions to observe changes of the data dimension over time.

At step 1130, the method can update the data dimension upon a change in data dimension;

At step 1140, the method can persist previous changes to the data dimension based upon metadata associated with the data dimension.

In accordance with an embodiment, a data dimension of the data dimensions slowly changes over time. Metadata associated with the data dimension can be updated upon a change in the slowly changing data dimension. The hierarchical structure of data dimensions can persist previous changes to the data dimension based upon the metadata associated with the data dimension.

In accordance with an embodiment, such methods and systems described in the figures above can enhance and/or improve the performance of a computing environment in which the embodiments are practiced (e.g., a multidimensional database environment). Traditionally, for example, changes to dimensions, where the changes are slow changes, must be captured via, for example, a snapshot of the multidimensional database each time a change in data occurred. This leads to both increased processing load (snapshot process), but also to increased demand on storage (saving and storing each snapshot). By providing the systems and methods discussed above, changes to data in slowly changing dimensions can instead be captured in a current model of a multidimensional database, without the need for snapshots.

The metadata associated with the links or relationships between dimensions of slowly changing dimensions provide for reduced storage needs, as well as reduced processing load.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity;

and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A method for supporting dimension and metadata versioning in a multidimensional database server executing on the computer, the method comprising:
providing a metadata store associated with the multidimensional database server;
providing a hierarchical data structure, the hierarchical data structure comprising at least two levels, each of the at least two levels comprising a plurality of data dimensions;
defining links between the plurality of dimensions wherein said links are expressed in metadata maintained for the hierarchical data structure in the metadata store;
tracking the plurality of data dimensions to detect changes in links of the plurality of data dimensions over time; and
upon detecting a change in a link of a data dimension of the plurality of data dimensions,
persisting previous changes in links of said data dimension in metadata associated with said data dimension in the metadata store wherein each of said previous changes is associated with a change time,
updating said data dimension to reflect said detected change in link, and
updating the metadata associated with the data dimension to reflect said detected change in link;
wherein the hierarchical data structure is adapted for processing a query at the multidimensional database server, the query comprising a specified time for a snapshot of the hierarchical data structure;
wherein the update to the metadata upon the detected change is indicative of a first time at which the detected change occurred; and
wherein the metadata associated with the data dimension is further updated upon a second change in a slowly changing data dimension.

2. The method of claim 1, wherein the further update to the metadata upon the second change is indicative of a second time at which the second change occurred, the second time being later than the first time.

3. The method of claim 2, wherein upon the specified time is after the first time and before the second time, the multidimensional database server provides a first snapshot of the hierarchical data structure, the first snapshot being reflective of the first change.

4. The method of claim 2, wherein upon the specified time is after the second time, the multidimensional database server provides a second snapshot of the hierarchical data structure, the second snapshot being reflective of the first change and the second change.

5. A system for supporting dimension and metadata versioning in a multidimensional database server executing on the computer, comprising:
a metadata store associated with the multidimensional database server; and
a hierarchical data structure, the hierarchical data structure comprising at least two levels, each of the at least two levels comprising a plurality of data dimensions;
wherein the system is adapted to:
define links between the plurality of dimensions wherein said links are expressed in metadata maintained for the hierarchical data structure in the metadata store;
track the plurality of data dimensions to detect changes in links of the plurality of data dimensions over time; and
upon detecting a change in a link of a data dimension of the plurality of data dimensions,
persist previous changes in links of said data dimension in metadata associated with said data dimension in the metadata store wherein each of said previous changes is associated with a change time,
update said data dimension to reflect said detected change in link, and
update the metadata associated with the data dimension to reflect said detected change in link;
wherein the hierarchical data structure is adapted for processing a query at the multidimensional database server, the query comprising a specified time for a snapshot of the hierarchical data structure;

wherein the update to the metadata upon the detected change is indicative of a first time at which the detected change occurred; and wherein the metadata associated with the data dimension is further updated upon a second change in a slowly changing data dimension.

6. The system of claim 5 wherein the further update to the metadata upon the second change is indicative of a second time at which the second change occurred, the second time being later than the first time.

7. The system of claim 6, wherein upon the specified time is after the first time and before the second time, the multidimensional database server provides a first snapshot of the hierarchical data structure, the first snapshot being reflective of the first change.

8. The system of claim 7, wherein upon the specified time is after the second time, the multidimensional database server provides a second snapshot of the hierarchical data structure, the second snapshot being reflective of the first change and the second change.

9. A non-transitory computer readable storage medium having instructions thereon for supporting dimension and metadata versioning in a multidimensional database server executing on the computer, that when read and executed perform a method comprising:

providing a metadata store associated with the multidimensional database server;

providing a hierarchical data structure, the hierarchical data structure comprising at least two levels, each of the at least two levels comprising a plurality of data dimensions;

defining links between the plurality of dimensions wherein said links are expressed in metadata maintained for the hierarchical data structure in the metadata store;

tracking the plurality of data dimensions to detect changes in links of the plurality of data dimensions over time; and upon detecting a change in a link of a data dimension of the plurality of data dimensions, persisting previous changes in links of said data dimension in metadata associated with said data dimension in the metadata store wherein each of said previous changes is associated with a change time, updating said data dimension to reflect said detected change in link, and updating the metadata associated with the data dimension to reflect said detected change in link;

wherein the hierarchical data structure is adapted for processing a query at the multidimensional database server, the query comprising a specified time for a snapshot of the hierarchical data structure;

wherein the update to the metadata upon the detected change is indicative of a first time at which the detected change occurred; and wherein the metadata associated with the data dimension is further updated upon a second change in a slowly changing data dimension.

10. The non-transitory computer readable storage medium of claim 9, wherein the further update to the metadata upon the second change is indicative of a second time at which the second change occurred, the second time being later than the first time.

11. The non-transitory computer readable storage medium of claim 10, wherein upon the specified time is after the first time and before the second time, the multidimensional database server provides a first snapshot of the hierarchical data structure, the first snapshot being reflective of the first change.

12. The non-transitory computer readable storage medium of claim 10, wherein upon the specified time is after the second time, the multidimensional database server provides a second snapshot of the hierarchical data structure, the second snapshot being reflective of the first change and the second change.

* * * * *

UNITED STATES PATENT AND TRADEMARK OFFICE
CERTIFICATE OF CORRECTION

PATENT NO. : 11,704,294 B2
APPLICATION NO. : 17/200589
DATED : July 18, 2023
INVENTOR(S) : Ramaiyer It is certified that error appears in the above-identified patent and that said Letters Patent is hereby corrected as shown below:

On the Title Page

Column 2, under Other Publications, Line 8, delete "hllps://" and insert -- https:// --, therefor.

On page 2, Column 2, under Other Publications, Line 34, delete "retreived" and insert -- retrieved --, therefor.

In the Specification

In Column 1, Line 52, after "herein" delete "is", therefor.

In Column 6, Line 11, delete "–Tier 1" and insert -- Tier 1 --, therefor.

In Column 6, Line 28, delete "to," and insert -- t0, --, therefor.

In Column 6, Line 46, delete "o" and insert -- of --, therefor.

In Column 11, Line 30, delete "=O(nm)" and insert -- =O(n.m) --, therefor.

In Column 13, Line 43, delete "dimension;" and insert -- dimension. --, therefor.

In Column 14, Line 34, delete "Technology:" and insert -- Technology): --, therefor.

In Column 14, Lines 37-48, delete "and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud Signed and Sealed this
Fourth Day of June, 2024

Katherine Kelly Vidal
*Director of the United States Patent and Trademark Office* deployment models including, but not limited to, cloud SaaS, cloud DBaaS, cloud PaaS, and cloud IaaS." and insert the same on Column 14, Line 36, as a continuation of the same paragraph.